United States Patent
Yamada et al.

(10) Patent No.: US 6,335,122 B1
(45) Date of Patent: Jan. 1, 2002

(54) CARBONACEOUS ELECTRODE MATERIAL FOR NON-AQUEOUS SECONDARY BATTERY

(75) Inventors: Shinichiro Yamada; Hiroshi Imoto; Hideto Azuma, all of Kanagawa-ken; Tadashi Senoo, Tokyo; Koji Sekai, Kanagawa-ken; Masayuki Nagamine, Fukushima-ken; Atsuo Omaru, Fukushima-ken; Naohiro Sonobe, Fukushima-ken; Jiro Masuko, Tokyo; Minoru Ishikawa, Fukushima-ken, all of (JP)

(73) Assignees: Sony Corporation; Kureha Kagaku Kogyo Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/402,122
(22) PCT Filed: Apr. 3, 1998
(86) PCT No.: PCT/JP98/01539
   § 371 Date: Dec. 16, 1999
   § 102(e) Date: Dec. 16, 1999
(87) PCT Pub. No.: WO98/44580
   PCT Pub. Date: Oct. 8, 1998

(30) Foreign Application Priority Data

Apr. 3, 1997 (JP) ................................. 9-099580

(51) Int. Cl.$^7$ ................................. H01M 4/58
(52) U.S. Cl. .................... 429/231.4; 429/209; 429/213; 429/231.8; 429/231.9
(58) Field of Search ................ 429/209, 213, 429/231.4, 231.8, 231.9

(56) References Cited

U.S. PATENT DOCUMENTS 5,741,472 A * 4/1998 Sonobe et al. ............... 423/460

FOREIGN PATENT DOCUMENTS

| EP | 0549802 | 7/1993 |
| EP | 0700106 | 3/1996 |
| EP | 0758801 | 2/1997 |
| EP | 0817295 | 1/1998 |

* cited by examiner

Primary Examiner—Carol Chaney
Assistant Examiner—Dah-Wei Yuan
(74) Attorney, Agent, or Firm—Wenderoth, Lind & Ponack, L.L.P.

(57) ABSTRACT

A carbonaceous electrode having improved capacities for doping and dedoping of a cell active substance, such as lithium, and suitable for a non-aqueous solvent secondary battery, is constituted by a carbonaceous material having a true density as measured by a butanol substitution method of at most 1.46 g/cm$^3$, a true density as measured by a helium substitution method of at least 1.7 g/cm$^3$, a hydrogen-to-carbon atomic ratio H/C of at most 0.15 as measured according to elementary analysis, a BET specific surface area of at most 50 m$^2$/g as measured by nitrogen adsorption BET method, and a carbon dioxide adsorption capacity of at least 10 ml/g. The carbonaceous material is advantageously produced by carbonizing an organic material originated from bamboo genera of family Gramineae, particularly genus Pleioblastus or Bambusa, at 1000–1400° C. under a reduced pressure or under a flowing inert gas stream to provide an appropriate porous structure.

7 Claims, 1 Drawing Sheet

CARBONACEOUS ELECTRODE MATERIAL FOR NON-AQUEOUS SECONDARY BATTERY

This application is a 371 application of PCT/JP98/01539 filed Apr. 3, 1998.

TECHNICAL FIELD

The present invention relates to a carbonaceous material suitable as an electrode material for a non-aqueous secondary battery, and a process for production thereof. The present invention also relates to an electrode structure comprising such a carbonaceous electrode material, and a non-aqueous secondary battery having such an electrode structure.

BACKGROUND ART

Along with size-reduction of electronic devices and apparatus, development of batteries with higher energy densities has been demanded and, in response to such demands, various non-aqueous electrolytic solution batteries, including so-called lithium batteries, have been proposed.

However, a battery using lithium metal for a negative electrode, particularly when constituted as a secondary battery, is accompanied with difficulties, such as (1) inferior charging characteristic, as represented by an ordinary charging time of 5–10 hours, (2) a short cycle life, etc. These difficulties may be all attributable to lithium metal per se and have been assumed to be caused by, e.g., change in form of lithium, formation of lithium dendrite or irreversible change of lithium accompanying the repetition of charge-discharge cycles.

As a measure for obviating the above-mentioned difficulties, it has been proposed to use a carbonaceous material for a negative electrode (e.g., Japanese Laid-Open Patent Application (JP-A) 62-90863, and JP-A 62-122066). This negative electrode has been developed by utilizing a phenomenon that a lithium-intercalated carbon compound is easily formed electrochemically. For example, when a negative electrode comprising carbon is charged in a non-aqueous electrolytic solution, lithium in a lithium-containing positive electrode is electrochemically intercalated between layers of the negative electrode carbon (i.e., the negative electrode carbon is electrochemically doped with lithium). The lithium-doped carbon thus formed functions as a lithium electrode and, during discharge of the battery, the lithium is released (or de-doped) from between the carbon layers to be returned to the positive electrode.

The current or electric capacity per unit weight of a carbonaceous material constituting such a carbonaceous negative electrode (Ah/kg) is determined by the lithium-doping capacity thereof, so that a carbonaceous negative electrode material may desirably show as large a lithium-doping capacity as possible (while a theoretical upper limit is given as one lithium atom per 6 carbon atoms).

Moreover, in order to ensure a sufficient operation time of a compact electronic device or apparatus and a sufficient life of an electricity supply package therefor, a secondary battery as described above is being desired to exhibit a still higher energy density and it is required to develop a carbonaceous electrode material having a still higher lithium doping and de-doping capacities.

DISCLOSURE OF INVENTION

In the course of research and development of high-performance carbonaceous electrode materials more suitably used for non-aqueous secondary batteries in view of the above-mentioned problems, we have examined, as a new carbon source, organic materials originated from plant and characterized by plant fiber. As a result, it has been found that a carbonaceous material obtained by appropriately calcining and carbonizing a certain class of fibrous plant materials provides a carbonaceous material having unexpectedly large doping and de-doping capacities, and the carbonaceous material is rich in fine pores suitable for doping with a battery (or cell) active substance, such as lithium, unlike the conventional carbonaceous electrode materials, whereby the present invention has been arrived at.

Accordingly, a principal object of the present invention is to provide a carbonaceous material having large doping and de-doping capacities.

Another object of the present invention is to provide a process for producing such a carbonaceous material, and a non-aqueous secondary battery having an electrode composed of such a carbonaceous material.

According to the present invention, there is provided a carbonaceous electrode material for a non-aqueous secondary battery, comprising a carbonaceous material having a true density as measured by a butanol substitution method of at most 1.46 g/cm$^3$, a true density as measured by a helium substitution method of at least 1.7 g/cm$^3$, a hydrogen-to-carbon atomic ratio H/C of at most 0.15 as measured according to elementary analysis, a BET specific surface area of at most 50 m$^2$/g as measured by nitrogen adsorption BET method, and a carbon dioxide adsorption capacity of at least 10 ml/g.

The carbonaceous material according to the present invention is a so-called non-graphitizable carbon and can store a cell active substance between carbon layers and in fine pores therein. Moreover, the carbonaceous material of the present invention is characterized by a true density as measured by butanol substitution method of at most 1.46 g/cm$^3$ and a true density as measured by helium substitution method of at least 1.70 g/cm$^3$, representing the presence a substantial proportion of fine pores into which butanol is not penetrable but helium can intrude. Such fine pores not penetrable by butanol but intrudable by helium are useful for storing of (i.e., doping with) the active substance and accordingly provide larger doping and de-doping capacities for the active substance by the contribution thereof.

The carbonaceous material according to the present invention may preferably have a potassium content of at most 0.5 wt. % as measured by fluorescent X-ray analysis.

According to the present invention, there is further provided a process for producing a carbonaceous electrode material as described above, comprising: carbonizing an organic material originated from bamboo genera of family Gramineae at a temperature of 1000–1400° C. under a reduced pressure or in an inert gas atmosphere.

According to the present invention, there is also provided an electrode structure for a non-aqueous solvent secondary battery, comprising: an electroconductive substrate and a composite electrode layer disposed on at least one surface of the electroconductive substrate; the composite electrode layer comprising the above-mentioned carbonaceous material in a particulate form, and a binder.

According to the present invention, there is further provided a non-aqueous solvent secondary battery, comprising a positive electrode, a negative electrode, and a separator and a non-aqueous electrolytic solution disposed between the positive and negative electrodes; wherein at least one of the positive and negative electrodes comprises an electrode structure as described above.

DETAILED DESCRIPTION OF THE INVENTION

Figure 1:
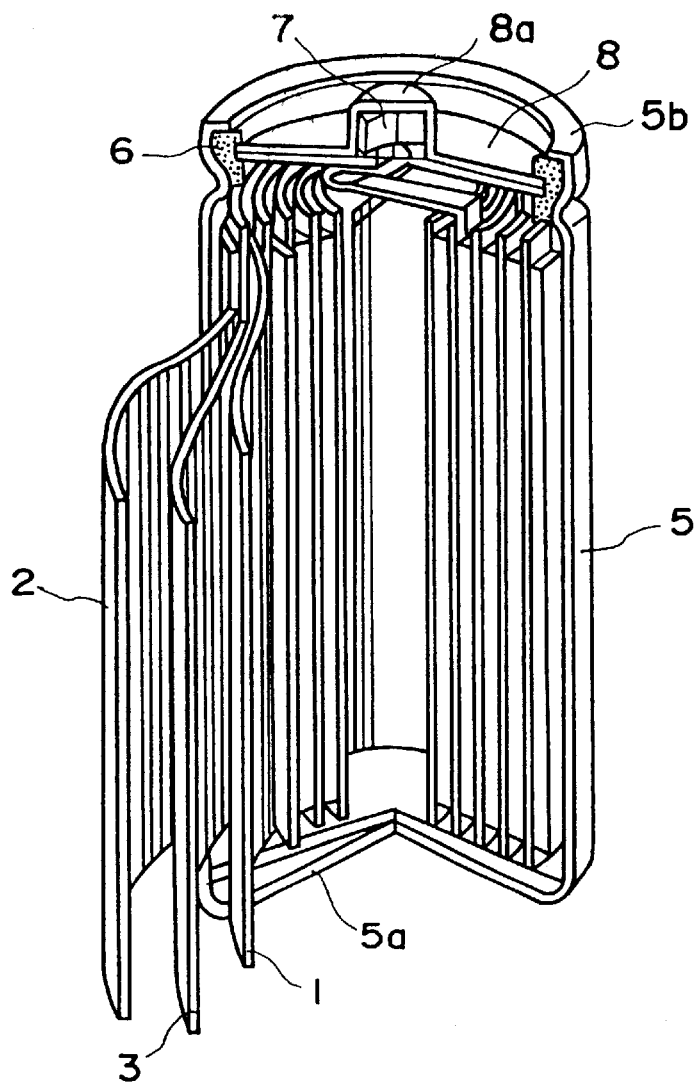
FIG. 1 is a partially exploded perspective view of a non-aqueous solvent secondary battery which can be constituted according to the invention.

The carbonaceous materials according to the present invention is characterized by a true density (hereinafter sometimes denoted by "$\rho_B$") of at most 1.46 g/cm$^3$ as measured by the butanol substitution method using butanol as the substitution medium, a true density (hereinafter sometimes denoted by "$\rho_H$") of at least 1.7 g/cm$^3$ as measured by the helium substitution method using helium gas as the substitution medium, a hydrogen-to-carbon atomic ratio H/C of at most 0.15 as measured according to elementary analysis, and a BET specific surface area (hereinafter sometimes denoted by "$S_{BET}$") of at most 50 m$^2$/g.

A carbonaceous material of $\rho_B$ exceeding 1.46 g/cm$^3$ is caused to have a smaller doping-dedoping capacity. $\rho_B$ may preferably be at most 1.45 g/cm$^3$.

A carbonaceous material of $\rho_H$ below 1.7 g/cm$^3$ is similarly caused to have a reduced doping-dedoping capacity. $\rho_H$ may preferably be at least 1.8 g/cm$^3$, further preferably at least 1.9 g/cm$^3$.

A carbonaceous material having a hydrogen-to-carbon atomic ratio H/C exceeding 0.15 as represented by a low temperature-treated carbon obtained by treating an organic substance at a temperature of at most 800° C., or a carbonaceous material having a specific surface area $S_{BET}$ exceeding 50 m$^2$/g as represented by activated carbon, is not preferred, because of an increase in non-dedoping capacity (i.e., an amount of active substance remaining in the carbonaceous material without dedoping). H/C may preferably be at most 0.13, further preferably at most 0.10. The specific surface area $S_{BET}$ may preferably be at most 20 m$^2$/g, further preferably at most 10 m$^2$/g.

Another characteristic feature of the carbonaceous material according to the present invention is that it has a carbon dioxide adsorption capacity of at least 10 ml/g (as a specific gas volume calculated under a standard state (STP) of 0° C. and 1 atm (100 kPa)) as measured at 0° C. and an equilibrium pressure of 95 kPa. A carbonaceous material having a carbon dioxide adsorption capacity of below 10 ml/g exhibits only a small doping capacity for an active substance, such as lithium. Such a carbonaceous material having a small carbon dioxide adsorption capacity does not have sufficiently developed fine pores or is provided with closed pores to which carbon dioxide cannot intrude.

It is believed that an active substance, such as lithium, can be stored or occluded also in fine pores in the carbonaceous material of the present invention. It is believed that a carbonaceous material having a small carbon dioxide adsorption capacity as described above has few pores capable of occlusion with an active substance, thus showing only a small doping capacity for the active substance. The carbonaceous material of the present invention may preferably have a carbon dioxide adsorption capacity of at least 15 ml/g, more preferably at least 20 ml/g.

The carbonaceous material according to the present invention may preferably have a potassium content of at most 0.5 wt. % as measured by fluorescent X-ray analysis. A larger potassium content leads to a smaller dedoping capacity and a larger non-dedoping capacity. The potassium content may more preferably be at most 0.4 wt. %, further preferably at most 0.3 wt. %, particularly preferably at most 0.2 wt. %.

It is desirable that the carbonaceous material of the present invention has a (002)-plane spacing of at least 0.365 nm, preferably 0.370–0.395 nm, as measured by X-ray diffraction method.

The carbonaceous material according to the present invention may be produced by carbonizing various organic materials under conditions suitable for pore formation.

Any organic materials may be used as starting materials as far as they can generate volatile matter at the time of carbonization thereof. Examples thereof may include naturally occurring organic materials, such as petroleum pitch and coal pitch, and various organic materials commercially produced from natural organic materials, such as petroleum.

The petroleum or coal pitch may be produced from coal tar; tars obtained by high-temperature thermal decomposition of ethylene bottom oil, crude oil, etc.; asphalt, etc., by processes, such as distillation (inclusive of vacuum distillation, normal pressure distillation and steam distillation), thermal polycondensation, extraction, or chemical polycondensation.

The organic materials may comprise any organic compounds, examples of which may include: furan resins, such as homopolymers and copolymers of furfuryl alcohol or furfural, phenolic resins, acrylic resins, halogenated vinyl resins, polyimide resins, polyamide-imide resins, polyamide resins, conjugated resins such as polyacetylene and poly(p-phenylene), cellulose and cellulose derivative.

In addition, examples of other available organic starting materials may include: condensed polycyclic hydrocarbon compounds, such as naphthalene, phenanthrene, anthracene, triphenylene, pyrene, perylene, pentaphene, and pentacene, and their derivatives, such as their corresponding carboxylic acids, carboxylic anhydrides and carboxylimides; various pitches principally comprising such compounds, condensed heteropolycyclic compounds, such as acenaphthylene, indole, isoindole, quinoline, isoquinoline, quinoxaline, furaradine, carbazole, acridine, phenazine, and phenanthridine, and derivatives thereof.

It is possible to introduce an oxygen-containing functional group, as desired, into such pitch materials or organic materials. This may be effected, for example, through a wet process using an aqueous solution of nitric acid, sulfuric acid or hypochlorous acid, or a dry process using an oxidizing gas, such as air or oxygen. It is also possible to add, as desired, a chlorine compound, such as ferric chloride or zinc chloride, or a dehydrogenating agent, such as sulfur, ammonium nitrate or ammonium persulfate.

It is also possible to provide a starting material for the carbonaceous material of the present invention by blending two or more species of the above-mentioned organic materials or by blending a carbonaceous material such as carbon fiber with such an organic material.

The carbonaceous material of the present invention may be produce by carbonizing a starting organic material as described above. The maximum temperature and the temperature-raising state for the carbonization are not particularly restricted. For example, after a preliminary calcination at 300–800° C. in an inert atmosphere, the carbonization may be performed under the conditions of a temperature-raising rate of at least 1° C./min., a maximum temperature of 900–3000° C. and a holding time at the maximum temperature of 0–5 hours. The preliminary calcination can be omitted. The inert atmosphere may be provided by an inert gas, examples of which may include nitrogen, argon and helium. It is also possible to use an inert gas containing a small amount of halogen gas. In order to obtain a shaped form of carbonaceous material, the starting organic material can be formed prior to the preliminary calcination or carbonization, or during the process of the preliminary calcination or carbonization. The resultant carbonaceous material may be used as a carbonaceous electrode material for batteries after pulverization and classification, or as it is in the shaped form. The pulverization may be performed at any stage of before carbonization, after carbonization or after preliminary calcination.

More preferably, the carbonaceous material of the present invention may be easily prepared according to a process as described below.

Thus, a plant material of bamboo genera of family Gramineae (i.e., rice family) is carbonized in a temperature region of 1000–1400° C. under a reduced pressure or in an inert gas atmosphere. The inert gas can contain a small amount of halogen gas.

Alternatively, a carbon precursor originated from bamboo genera of family Gramineae having a potassium content of at most 0.5 wt. %, may be carbonized in a temperature region of 1000–1400° C. under a reduced pressure or in an inert gas atmosphere. Herein, the carbon precursor originated from bamboo genera of family Gramineae may include an organic material originated rom bamboo genera of family Gramineae as it is or after a deashing-treatment as described hereinafter, and a precalcination product of such an organic material originated from bamboo genera of family Gramineae as calcined or after a further de-ashing treatment.

The inert gas used in the above process may be nitrogen gas, argon gas, helium gas or a mixture of these and may desirably further contain a small amount of halogen gas, such as chlorine gas, bromine gas, iodine gas or fluorine gas. Chlorine gas may be preferred. The halogen gas concentration in the halogen-containing inert gas may preferably be ca. 4–40 mol. %.

Preferred examples of the organic materials of bamboo genera of family Gramineae as a preferred carbon source for providing the carbonaceous material according to the present invention may include the following (terms in parentheses are phonetic translations from Japanese terms regardless of whether a corresponding English (Latin or Greek) scientific term is found or not): genus Chnequea or Shibataea (Okamezasa), genus (Shihouchiku), genus (Narihiradake (Rikuchudake, Narihiradake, Kumanarihira, Medaranarihi ra, Himeyashadake, Bizennarihira, Kenashinarihira, Yashadake, Nikkohnarihira, Aonarihira)), genus (Tohchiku (Tohchiku)), genus Dendrocalamus, Melocanna or Pseudosasa (Yadake (Yakushimadake, Yadake, Men'yadake, Rakkyohyadake)), genus Sasaella (Azumazasa (Reikoshino, Johbohzasa, Genkeichiku, Nambushino, Maezawazasa, Suekozasa)), genus Sasa (Kumazasa (Kitamikozasa, Miyamasuzu, Geibikumazasa, Rokkohmiyamazasa, Yamatozasa, Yonaizasa, Kuzakaizasa, Kintaizasa, Shakotanchiku, Hushibutozasa, Tanahashizasa, Yasikumasozasa, Gotembazasa, Hatsurohzasa, Ohshidazasa, Himekamizasa, Nambusuzu, Fushigehimekamizasa, Kansaizasa, Miyamakumazasa, Tanzawazasa, Arimakosuzuinusuzu, Kumasuzuhangesuzu, Kesuzu, Kintaichishima, Nemaradidake)), Sasamorpha (Suzudake), genus Chimobambusa (Kanchiku), genus Pleioblastus (Medake (Ryukyuhohiku), Kanzanchiku, Taiminchiku, Medakehagawarimedake, Sudareyoshigokidake, Bohshuhnezasa, Azumamezasa, Johhoujidake, Oroshimachiku, Kenezasa), genus Bambusa (Soruniibamboo or Houraichiku (Houraichiku, Shuchiku, Dausanchiku)), and genus (Shichiku). Among these, organic materials belonging to genus Pleioblastus or genus Bambusa are preferred.

In using the above-mentioned organic materials of bamboo genera, it is possible to use plural species or genera of bamboo.

Prior to the carbonization, such an organic material originated from bamboo genera of family Gramineae may preferably be pre-calcined at 300–800° C. in an inert gas atmosphere or under a reduced pressure in order to remove tar and other volatile matters. Such a plant material may contain potassium at a content which may depend on the plant species, and a carbonaceous material obtained by carbonizing a starting material having a high potassium content is caused to exhibit inferior performances as a carbonaceous electrode material, as represented by a smaller de-dedoping capacity and a larger non-dedoping capacity for an active substance, such as lithium.

An organic material originated from bamboo genera of family Gramineae, or a carbon precursor obtained by pre-calcination of such an organic material may be provided with a reduced potassium content by a de-ashing treatment. The tolerable potassium content may be at most 0.5 wt. %, preferably at most 0.4 wt. %, further preferably at most 0.3 wt. %, particularly preferably at most 0.2 wt. %. This condition should be satisfied by the carbonaceous material after the carbonization but preferably be already satisfied by a precursor before the carbonization.

The potassium removal (i.e., de-ashing) from an organic material originated from bamboo genera of family Gramineae may preferably be effected by pulverizing such an organic material as it is or after coarse crushing, or a carbon precursor formed by preliminarily calcining such an organic material at a temperature of ca. 300–800° C., into fine particles, and then dipping the fine particles in an acid, such as hydrochloric acid, or water, for de-ashing. If the material to be processed for de-ashing has a large particle size, the de-ashing efficiency can be remarkably lowered, so that the material to be de-ashed should preferably be in the form of particles having an average particle size of at most 100 $\mu$m, more preferably at most 50 $\mu$m. The de-ashing treatment may preferably be applied to a carbon precursor obtained through pre-calcination at ca 300 to 800° C., so as to provide a good de-ashing efficiency. A higher pre-calcination temperature exceeding 800° C. is not preferred because it rather results in a lower de-ashing efficiency.

More specifically, the de-ashing treatment may be effected by dipping the material to be de-ashed in an acid, such as hydrochloric acid, or water, to extract and remove potassium therefrom. In the case of using water, the temperature for de-ashing may preferably be at least 50° C., more preferably 80° C. or higher, as a lower water temperature results in a remarkably lower de-ashing efficiency.

As for dipping as an operation for de-ashing, it is more effective to repeat a short period of dipping than performing once a long period of dipping in order to improve the de-ashing efficiency. The de-ashing may preferably be effected by performing two times or more of the dipping with water after the dipping in an acid.

The carbonization may desirably be performed while taking care so as not to obstruct the formation a porous structure due to tar or decomposition products, such as hydrogen and methane. If the carbonization is allowed to proceed in a dense atmosphere of decomposition products, the formation of fine pores is liable to be insufficient to result in a carbonaceous material having a lower capacity for doping with the active substance.

As the organic material originated from bamboo genera of family Gramineae is inherently porous because of the presence of vessels, sieve tubes, etc., the dissipation or removal of decomposition products during the carbonization is facilitated to result in a large volume of pores having a relatively large diameter.

According to a preferred embodiment of the production process of the present invention, a carbon precursor originated from bamboo genera of family Gramineae is carbonized while flowing an inert gas or a halogen-containing inert gas (hereinafter sometimes inclusively referred to as a "treatment gas") in contact with the carbon precursor. In this instance, the material to be carbonized (i.e., carbon precursor) may be disposed in a piled layer within a reactor and is carbonized while flowing the inert gas in a space outside but in contact with the layer (outside-layer flow scheme), or the material to be carbonized (carbon precursor) is disposed in a layer or bed and is carbonized while flowing the inert gas through within the layer or bed (intra-layer flow scheme).

In a batch-wise outside-layer flow scheme, it is preferred to suppress the piled layer thickness of the material to be carbonized as thin as possible so as to increase the area of contact of the material layer with the inert gas and allow quick removal of the decomposition product from the material out of the system. The piled layer thickness of the material to be carbonized may preferably be at most 50 mm, more preferably at most 30 mm. The inert gas may be supplied or flowed at a vacant reactor-basis speed of at least 1 mm/sec, more preferably at least 5 mm/sec.

It is preferred to adopt an intra-layer flow scheme of a continuous-type or a batch-type using a fluidized bed, a fixed bed, etc. In this case, the inert gas may preferably be supplied or flowed at a rate of at least 10 ml, more preferably at least 50 ml, further preferably at least 100 ml, per gram of the material to be carbonized, while it can depend on the amount of the material to be carbonized per unit time. A higher inert gas supply rate may be preferred in view of the properties of the product carbonaceous material, but practically the supply rate may be at most 500 ml per gram of the material to be carbonized. The gas supply rate referred to herein is calculated based on the volume of the treatment gas under the standard state (0° C. and 1 atm).

The carbonization may be performed at a temperature of 1000–1400° C. Carbonization at a temperature below 1000° C. results in an increased non-dedoping active substance capacity of the product carbonaceous material. Carbonization at a temperature higher than 1400° C. results in a decrease in capacity for doping with active substance.

Next, the non-aqueous solvent secondary battery of the present invention will be described.

The carbonaceous material according to the present invention has a micro-texture suitable for doping with lithium and can be suitably used as an electrode material for lithium batteries for constituting a positive electrode or a negative electrode to be doped with lithium as an active substance. It is particularly preferred that the carbonaceous material is used for constituting a negative electrode for doping with lithium as a negative electrode active substance of a non-aqueous solvent lithium secondary battery.

FIG. 1 is a partially exploded perspective view of a non-aqueous solvent lithium secondary battery as a preferred embodiment of the battery according to the present invention.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element.

Figure 2:
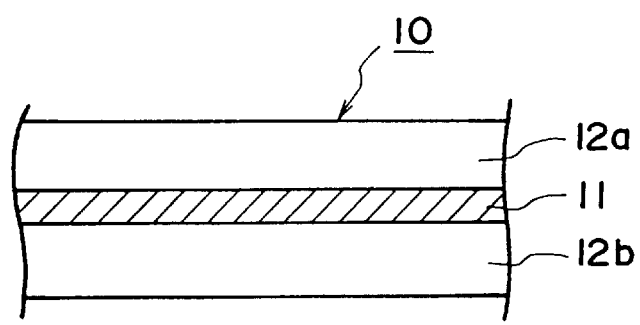
FIG. 2 is a partial sectional view of an electrode structure adopted in the secondary battery.

Herein, the positive electrode 1 or negative electrode 2 may be constituted by an electrode structure 10 having a sectional structure as partially shown in FIG. 2. More specifically, the electrode structure 10 includes an electroconductive substrate 11 comprising a foil or wire net of a metal, such as iron, stainless steel, copper, aluminum, nickel or titanium and having a thickness of, e.g., 5–100 $\mu$m, or 5–20 $\mu$m for a small-sized battery, and a composite electrode layer (12a, 12b) of, e.g., 10–1000 $\mu$m, preferably 10–200 $\mu$m, in thickness for a small-sized battery, on at least one surface, preferably on both surfaces as shown in FIG. 2, of the electroconductive substrate 11.

The composite electrode layers 12a and 12b are respectively a layer comprising a particulate carbonaceous material according to the present invention, an electroconductive material such as electroconductive carbon, optionally included, and a binder such as polyvinylidene fluoride or a vinylidene fluoride copolymer, formed on the electroconductive substrate 11.

More specifically, in case of using the carbonaceous material according to the present invention for producing an electrode structure 10 (in FIG. 2, corresponding to an electrode 1 or 2 in FIG. 1) of a non-aqueous solvent secondary battery as described above, the carbonaceous material may be optionally formed into fine particles having an average particle size of 5–100 $\mu$m and then mixed with a binder stable against a non-aqueous solvent, such as polyvinylidene fluoride, polytetrafluoro-ethylene or polyethylene, to be applied onto an electroconductive substrate 11, such as a circular or rectangular metal plate, to form, e.g., a 10–200 $\mu$m-thick layer. The binder may preferably be added in a proportion of 1–20 wt. % of the carbonaceous material. If the amount of the binder is excessive, the resultant electrode is liable to have too large an electric resistance and provide the battery with a large internal resistance. On the other hand, if the amount of the binder is too small, the adhesion of the carbonaceous material particles with each other and with the electroconductive substrate 11 is liable to be insufficient. The above described formulation and values have been set forth with respect to production of a secondary battery of a relatively small size, whereas, for production of a secondary battery of a larger size, it is also possible to form the above-mentioned mixture of the carbonaceous material fine particles and the binder into a thicker shaped product, e.g., by press-forming, and electrically connect the shaped product to the electroconductive substrate.

The carbonaceous material of the present invention can also be used as a positive electrode material for a non-aqueous solvent-type secondary battery by utilizing its good doping characteristic but may preferably be used as a negative electrode material of a non-aqueous solvent-type secondary battery, particularly for constituting a negative electrode to be doped with lithium as an active substance of a lithium secondary battery, as mentioned above.

In the latter case, the positive electrode may be composed by using a metal oxide, a metal sulfate or a specific polymer as an active substance selected depending on a type of an objective battery. For example, a lithium-free metal sulfide or metal oxide, such as $TiS_2$, $MoS_2$, $NbSe_2$ or $V_2O_5$ can be used as a positive electrode active substance for a non-aqueous electrolytic solution lithium secondary battery but, in order to constitute a high-energy density battery, it is preferred to use a lithium complex principally comprising $Li_xMO_2$, wherein M represents at least one transition metal and x is a number ordinarily satisfying $0.05 \leq x \leq 1.10$. The metal M constituting the lithium complex oxide may preferably be Co, Ni or Mn, for example. Specific examples of such lithium complex oxides may include: $LiCoO_2$, $LiNiO_2$, $Li_xNi_yCo_{1-y}O_2$ (wherein x and y are numbers varying depending on the charge-discharge state of a battery concerned and ordinarily satisfying $0.7<x<1.2$ and $0<y<1$), and $LiMn_2O_4$. Such a lithium complex oxide may be prepared by pulverizing and blending a lithium carbonate, nitrate, oxide or hydroxide with a salt or compound of another metal in a desired ratio, and calcining the blend in an oxidizing gas atmosphere in a temperature range of 600–1000° C.

The non-aqueous electrolytic solution used in combination with the positive electrode and the negative electrode described above may generally be formed by dissolving an electrolyte in a non-aqueous solvent. The non-aqueous solvent may comprise one or two or more species of organic solvents, such as propylene carbonate, ethylene carbonate, dimethyl carbonate, diethyl carbonate, dimethoxyethane, diethoxyethane, γ-butyrolactone, tetrahydrofuran, 2-methyltetrahydrofuran, sulfolane, and 1,3-dioxolane. The electrolyte dissolved in such a non-aqueous solvent for constituting a non-aqueous electrolytic solution may comprise a salt of a light metal, such as lithium, sodium or aluminum, selected depending on the type of a battery using the non-aqueous electrolytic solution. For example, in the case of constituting a non-aqueous electrolytic solution lithium secondary battery, examples of the electrolyte may include $LiClO_4$, $LiPF_6$, $LiBF_4$, $LiCF_3SO_3$, $LiAsF_6$, $LiCl$, $LiBr$, $LiB(C_6H_5)_4$, and $LiN(SO_2CF_3)_2$. It is also possible to use a gel-form electrolyte, a polymeric electrolyte or an inorganic solid electrolyte instead of such an electrolytic solution.

As described above with reference to FIG. 1, a secondary battery of the present invention may generally be formed by disposing the above-formed positive electrode 1 and negative electrode 2 opposite to each other, optionally with a liquid-permeable separator 3 composed of, e.g., unwoven cloth or other porous materials, disposed therebetween, and dipping the positive and negative electrodes together with an intermediate permeable separator in an electrolytic solution as described above.

In the above, a cylindrical battery has been described as an embodiment of the non-aqueous secondary battery according to the present invention. However, the non-aqueous secondary battery according to the present invention can basically have any other shapes, such as those of a coin, a rectangular parallelepiped, or a paper or sheet.

Incidentally, the measurement of various parameters described herein, i.e., the true density by the butanol substitution method, the true density by the helium substitution method, the specific surface area by nitrogen adsorption, the hydrogen/carbon atomic ratio (H/C), the potassium content by fluorescent X-ray analysis, the average layer spacing $d_{002}$ by X-ray diffraction and the $CO_2$ adsorption capacity at 0° C. of carbonaceous materials, was performed in the following manner.

[True density ($\rho_B$) according to the butanol substitution method]

The true density of a carbonaceous material sample is measured pycnometrically with 1-butanol as a substitution medium according to a method prescribed in JIS R7212. The outline thereof is described hereinbelow.

A gravity bottle (pycnometer) having an inner volume of ca. 40 ml and equipped with a side pipe is accurately weighed (at $m_1$). At the bottom of the bottle, a sample is placed so as to provide a flat thickness of ca. 10 mm, and the total weight is measured (at $m_2$). Then, 1-butanol is gently added thereto up to a depth of ca. 20 mm from the bottom. Then, a slight vibration is applied to the bottle to confirm that large bubbles have disappeared, and then the gravity bottle is placed in a vacuum desiccator, which is gradually evacuated to a pressure of 2.0–2.7 kPa. The pressure is maintained for at least 20 min. and, after termination of bubble occurrence, the gravity bottle is taken out. The bottle is further filled with 1-butanol, and a stopper is put thereon. The bottle is further immersed for at least 15 min. in a thermostat water vessel (controlled at 30±0.03° C.) to set the 1-butanol level at a standard line. Then, the bottle is taken out and the outer surface thereof is well wiped out to accurately weigh the bottle (at $m_4$).

Separately, the same gravity bottle is filled with only 1-butanol and immersed in the thermostat water vessel, followed by setting of the standard line and accurate weighing to provide a mass ($m_3$).

Further, the gravity bottle is separately filled with distilled water immediately after boiling to remove dissolved gas and similarly immersed in the thermostat water vessel, followed by setting of the standard line and accurate weighing to provide a mass ($m_5$).

$\rho_B$ is calculated from the following equation.

$$\rho_B = (m_2 - m_1)(m_3 - m_1)d/[(m_2 - m_1 - (m_4 - m_3))(m_5 - m_1)],$$

wherein d denotes a specific gravity (=0.9946) of water at 30° C.

[True density $\rho_H$ according to the helium substitution method]

$\rho_H$ is measured with respect to a sample after being dried at 200° C. under a reduced pressure of at most 1 Pa for 2 hours by using a "Multi-Volume Pycnometer 1305" (trade name) available from Micromeritics Co. The environmental temperature during the measurement is made constant at 23° C. Each pressure used in the method is a gauge pressure obtained by subtracting an environmental pressure from an absolute pressure.

The measurement apparatus ("Multi-Volume Pycnometer 1305") includes a sample chamber equipped with a pressure gauge for measuring a pressure within the chamber, and an expansion chamber connected to the sample chamber via a connection pipe provided with a valve. A helium gas-introduction pipe provided with a stop valve is connected to the sample chamber, and a helium gas-discharge pipe provided with a stop valve is connected to the expansion chamber.

The measurement is performed in the following manner. The volume of the sample chamber ($V_{CELL}$) and the volume of the expansion chamber ($V_{EXP}$) are measured in advance by using a standard globe.

A sample is placed in the sample chamber, and the inner space of the apparatus is substituted with helium gas by flowing helium gas for 2 hours through the helium gas introduction pipe for the sample chamber, the connection pipe and the helium gas discharge pipe for the expansion chamber. Then, the valve between the sample chamber and the expansion chamber and the valve in the helium gas discharge pipe connected to the expansion chamber are closed (whereby helium gas remains in the expansion chamber at a pressure identical to the environmental pressure). Then, helium gas is introduced through the helium gas introduction pipe connected to the sample chamber up to a pressure of 134 kPa, and then the stop valve in the helium gas introduction pipe is closed. At 5 min. after closing the stop valve, the pressure ($P_1$) in the sample chamber is measured. Then, the valve between the sample chamber and the expansion chamber is opened to transfer the helium gas to the expansion chamber to provide an equal pressure ($P_2$) in the system, which is measured after 5 min. from the opening.

A sample volume ($V_{SAMP}$) is calculated from the following equation.

$$V_{SAMP}=V_{CELL}-V_{EXP}/[(P_1/P_2)-1].$$

Accordingly, when the sample weight is $W_{SAMP}$, the density ($\rho_H$) of the sample is calculated as follows.

$$\rho_H=W_{SAMP}/V_{SAMP}.$$

[Specific surface area by nitrogen adsorption]

An approximate equation $$v_m=1/(v\cdot(1-x))$$

derived from the BET equation was used to obtain $v_m$ (amount (cm$^3$/g-sample) of adsorbed nitrogen required to form a mono-molecular layer of nitrogen on the sample surface) from a measured nitrogen volume v at a relative pressure x (=0.3) according to the BET single-point method using nitrogen adsorption. From the thus-obtained vm-value, a specific surface area $S_{BET}$ was calculated based on the following equation:

$$S_{BET}=4.35\cdot v_m \text{ (m}^2\text{ /g)}.$$

More specifically, the nitrogen adsorption onto a carbonaceous material was performed at liquid nitrogen temperature by using "Flow Sorb II 23001" (available from Micromeritics Instrument Corp.) in the following manner.

A sample carbonaceous material pulverized into an average diameter of ca. 5–50 μm was packed in a sample tube, and the sample tube was cooled to −196° C. while flowing helium gas containing nitrogen at a concentration of 30 mol. %, thereby to cause the carbonaceous material to adsorb nitrogen. Then, the sample tube was restored to room temperature to measure the amount of nitrogen desorbed from the sample by a thermal conductivity-type detector, thereby to obtain the adsorbed nitrogen amount v (cm$^3$/g-sample).

[Potassium content by fluorescent X-ray analysis]

For potassium content measurement, carbon samples having prescribed potassium contents were prepared and subjected to measurement by a fluorescent X-ray analyzer to prepare a calibration curve for a relationship between potassium $K_\alpha$-ray intensity and potassium content in advance. Then, sample carbonaceous materials were subjected to measurement of potassium $K_\alpha$-ray intensities by the fluorescent X-ray analysis to obtain the potassium contents based on the calibration curve. The calibration curve was approximated into a straight line passing through the origin in a potassium content range of 0–2.5 wt. %.

The carbon samples used for making the calibration curve were prepared in the following manner. Petroleum coke free from potassium content prepared by calcination at 1200° C. was pulverized to an average particle size of 20 μm to obtain powdery carbonaceous materials. A prescribed amount of potassium hydrogen carbonate was added to each carbonaceous material and stirred after addition of some deionized water, and the resultant mixture was dried. In this way, several carbon samples having prescribed potassium contents were prepared.

The fluorescent X-ray analysis was performed by using "RIGAKU SYSTEM 3082E2" (available from Rigaku Denki K.K.) in the following manner. An upper part irradiation-type holder was used, and a sample measurement area was set within a circle having a diameter of 20 mm. More specifically, a ring having a diameter of 20 mm and a height of 5 mm was placed on a filter paper, and 0.935 g of a sample carbonaceous material was placed within the ring and surface-covered with a polyethylene terephthalate film to be subjected to the measurement. The measurement was performed by using germanium as an analyzing crystal and a proportional counter as a detector in a 2θ-range of 60–73 deg. at a scanning speed of 1 deg./min.

[$d_{002}$ of carbonaceous material]

A powdery sample of a carbonaceous material was packed in an aluminum-made sample cell and irradiated with monochromatic CuKa rays (wavelength λ=0.15418 nm) through a graphite monochromator to obtain an X-ray diffraction pattern. The peak position of the diffraction pattern is determined by the center of gravity method (i.e., a method wherein a the position of a gravity center of diffraction lines is obtained to determine a peak position as a 2θ value corresponding to the gravity center) and calibrated by the diffraction peak of (111) plane of high-purity silicon powder as the standard substance. The $d_{002}$ value is calculated from the Bragg's formula shown below.

$$d_{002}=\lambda/(2\cdot\sin\theta) \qquad \text{(Bragg's formula)}$$

[Hydrogen/carbon (H/C) atomic ratio]

A sample of carbonaceous material was subjected to elementary analysis by using a CHN analyzer, and a hydrogen/carbon(H/C) atomic ratio was calculated as a ratio of numbers of atoms of hydrogen/carbon based on the weight proportions of hydrogen and carbon in the sample.

[Carbon dioxide adsorption capacity]

A carbonaceous material sample is dried under vacuum at 130° C. for at least 3 hours by using a vacuum drier to provide a sample for measurement of carbon dioxide adsorption capacity by an apparatus ("Omnisorb 100 CX", available from Coulter Electronics, Inc.).

For measurement, 0.2 g of such a sample is placed in a sample tube and dried under a vacuum of at most $10^{-3}$ Pa at 200° C. for at least 3 hours, and thereafter the measurement of a carbon dioxide adsorption capacity is performed.

At a set adsorption temperature of 0° C., the sample tube containing the measurement sample is evacuated to a reduced pressure of at most 0.4 Pa, and then carbon dioxide gas is introduced and adsorbed by the sample until an equilibrium pressure of 95 kPa (corresponding to a relative pressure of 0.027) according to the constant volume method to measure a carbon dioxide adsorption capacity in terms of ml/g calculated under a standard state (STP).

EXAMPLES

Hereinbelow, the present invention will be described more specifically based on Examples and Comparative

13

Examples. All the volumes or flow rates of treatment gases described hereinafter are values calculated under the standard state (0° C., 1 atm).

Example 1

A starting material was provided by mixing chops (in sizes of ca. 3 mm×3 mm×3 mm) of bamboo of genus Pleioblastus and chops (in sizes of ca. 3 mm×3 mm×3 mm) of bamboo of genus Bambusa, respectively grown in Vietnam, in a weight ratio of 1:1, and was heated to 500° C. and held at 500° C. for 5 hours in a nitrogen atmosphere (normal pressure) for preliminary calcination, to prepare a carbon precursor having a volatile matter content of at most 2 wt. %. The carbon precursor was pulverized into a powdery carbon precursor having a weight-average particle size of ca. 25 μm, which exhibited a potassium content of 0.5 wt. %. Ca. 3 g of the powdery carbon precursor was piled in a layer of ca. 1–2 mm in thickness in an aluminum-made crucible and then placed in a horizontal tubular furnace of 75 mm in diameter to be heated to 1200° C. at a rate of 5° C./min. and held at 1200° C. for 1 hour for carbonization while flowing nitrogen gas at a rate of 5 liter/min.

The properties of the thus obtained carbonaceous material are inclusively shown in Table 1 appearing hereinafter together with those of carbonaceous materials prepared in Examples and Comparative Examples described below.

Example 2

The powdery carbon precursor prepared in Example 1 was subjected to a de-ashing treatment in two cycles each including dipping within 35%-hydrochloric acid for 1 hour and washing in boiling water for 1 hour to obtain a de-ashed powdery carbon precursor, which exhibited a potassium content of at most 0.1 wt. %. The de-ashed powdery carbon precursor was again pulverized to form a powdery carbon precursor of 25 μm in average particle size. Ca. 3 g of the powdery carbon precursor was piled in an aluminum-made crucible and then placed in a horizontal tubular furnace of 75 mm in diameter to be heated to 1100° C. at a rate of 5° C./min and held at 1100° C. for 1 hour for carbonization.

Examples 3 and 4

Carbonaceous materials were prepared in the same manner as in Example 2 except for changing the carbonization temperature to 1200° C. (Example 3) and 1300° C. (Example 4), respectively.

Comparative Examples 1 and 2

Carbonaceous materials were prepared in the same manner as in Example 2 except for changing the carbonization temperature to 800° C. (Comparative Example 1) and 1500° C. (Comparative Example 2), respectively.

Comparative Example 3

Coffee beans washed with warm water were pre-calcined by holding at 500° C. for 5 hours in a nitrogen gas atmosphere (normal pressure) and then pulverized into a powdery carbon precursor having an average particle size of 25 μm, which was carbonized in the same manner as in Example 1.

Comparative Example 4

Coconut shell char (available from M.C. Carbon K.K.) was pre-calcined by heating to 500° C. and holding at 500° C. for 5 hours in a nitrogen gas atmosphere (normal pressure) to obtain a carbon precursor having a volatile matter content of at most 2 wt. %. The carbon precursor was pulverized into a powdery carbon precursor having an average particle size of 25 μm. Ca. 3 g of the powdery carbon precursor was piled in an aluminum-made crucible and then placed in a horizontal tubular furnace of 75 mm in diameter to be heated to 1200° C. at a rate of 5° C./min. and held at 1200° C. for 1 hour for carbonization while flowing nitrogen gas at a rate of 5 liter/min.

Comparative Example 5

A trunk of Phyllostachys (Mohsoh bamboo) (produce of Fukushima-ken, Japan; age: 3, diameter: ca. 70 mm) was pre-calcined at 600° C. for 1 hour in a nitrogen gas atmosphere (normal pressure) and then pulverized into a powdery carbon precursor having an average particle size of 25 μm. The powdery carbon precursor was subjected to a de-ashing treatment in two cycles each including dipping within 35% hydrochloric acid for 1 hour and then washing within boiling water for 1 hour, to obtain a de-ashed carbon precursor.

Ca. 3 g of the de-ashed carbon precursor was piled in a ca. 1 to 2 mm-thick layer in a horizontal tubular furnace of 75 mm in diameter and heated to 1200° C. at a rate of 5° C./min and held at 1200° C. for 1 hour for carbonization while flowing nitrogen gas at a rate of 5 liter/min.

The properties of the carbonaceous materials prepared in the above Examples and Comparative Examples are inclusively shown in Table 1 appearing hereinafter.

[Doping/de-doping capacity for active substance]

The carbonaceous materials obtained in Examples and Comparative Examples were respectively used to prepare a non-aqueous solvent secondary battery (cell) and the performances thereof were evaluated in the following manner.

The carbonaceous material is generally suited for constituting a negative electrode of a non-aqueous solvent secondary battery. However, in order to accurately evaluate the performances of a carbonaceous material inclusive of a doping capacity (A) and a de-doping capacity (B) and also a non-dedoping capacity (A–B) for a cell active substance without being affected by a fluctuation in performance of a counter electrode material, a large excess amount of lithium metal showing a stable performance was used as a negative electrode, and each carbonaceous material prepared above was used to constitute a positive electrode, thereby forming a lithium secondary battery, of which the performances were evaluated.

More specifically, the positive electrode (carbon electrode) was prepared as follows. That is, 90 wt. parts of the carbonaceous material thus formulated in the form of fine particles and 10 wt. parts of polyvinylidene fluoride were mixed together with N-methyl-2-pyrrolidone to form a paste composite, which was then applied uniformly onto an aluminum foil. The composite, after being dried, was peeled off the aluminum foil and stamped into a 15 mm-dia. disk-shaped carbonaceous film. Separately, a 17 mm-dia. disk-shaped stainless steel net was spot-welded to an inner lid of a coin-shaped cell can of 2016 size (i.e., diameter of 20 mm×thickness of 1.6 mm), and the above-prepared disk-shaped carbonaceous film was press-bonded to the disk-shaped stainless steel net to form a positive electrode containing ca. 20 mg of the carbonaceous material.

On the other hand, a negative electrode (lithium electrode) was prepared in a glove box of an argon atmosphere in the following manner. A 17 mm-dia. disk-shaped stainless steel net was spot-welded to an outer lid of the coin-shaped cell can of 2016 size, and a 15 mm-dia. lithium disk formed by stamping a 0.5 mm-thick metallic lithium plate was press-bonded onto the disk-shaped stainless steel net to form a negative electrode.

The thus-prepared positive and negative electrodes, a porous polypropylene film as a separator disposed therebetween, and an electrolytic solution comprising a 1:1 (by volume)-mixture solvent of propylene carbonate and dimethoxyethane and $LiClO_4$ dissolved therein at a rate of 1 mol/liter, were used to form a coin-shaped non-aqueous solvent lithium secondary battery of 2016 size together with a polyethylene-made gasket in an argon glove box.

In the lithium secondary battery thus constituted, the carbonaceous material in the positive electrode was subjected to doping and dedoping of lithium to evaluate capacities therefor.

More specifically, the doping was effected by repeating a cycle including 1 hour of current conduction at a current density of 0.5 $mA/cm^2$ and 2 hours of pause until the equilibrium potential between the positive and negative electrodes reached 4 mV. The electricity thus flowed was divided by the weight of the carbonaceous material to provide a doping capacity (A) in terms of Ah/kg. Then, in a similar manner, a current was flowed in a reverse direction to dedope the lithium from the doped carbonaceous material. The de-doping was effected by repeating a cycle including 1 hour of current conduction at a current density of 0.5 $mA/cm^2$ and 2 hours of pause, down to a cut-off voltage of 1.5 volts. The electricity thus flowed was divided by the weight of the carbonaceous material to provide a dedoping capacity (B) in terms of Ah/kg. Then, a non-dedoping capacity (A-B) was calculated as a difference between the doping capacity (A) and the dedoping capacity (B), and a discharge efficiency (%) was obtained by dividing the dedoping capacity (B) with the doping capacity (A) and multiplying the quotient (B/A) with 100. The discharge efficiency is a measure of effective utilization of the active substance.

The performances of the lithium secondary batteries using positive electrodes of the respective carbonaceous materials measured in the above-described manner are summarized in the following Table 2.

In view of the results shown in Table 2, it is understood that the secondary batteries prepared by using the carbonaceous materials obtained in Examples of the present invention exhibited a high doping capacity, a high dedoping capacity and a remarkably small non-dedoping capacity as a difference between the doping capacity and the dedoping capacity, thus allowing effective utilization of a cell active substance.

The secondary battery obtained by using a carbonaceous material of Comparative Example 1 exhibited a large doping capacity but also a very large non-dedoping capacity, thus being accompanied with a difficulty that lithium as the active substance could not be effectively utilized.

The secondary batteries obtained by using carbonaceous materials of Comparative Examples 2–5 exhibited smaller dedoping capacities.

TABLE 1

Properties of carbonaceous material

| | Starting material | Carbonization temp. (° C.) | $\rho_B$ (g/cm³) | $\rho_H$ (g/cm³) | H/C | $S_{BET}$ (m²/g) | K-content (%) | $d_{002}$ (nm) | *1 $ACO_2$ (ml/g) |
|---|---|---|---|---|---|---|---|---|---|
| Ex. | | | | | | | | | |
| 1 | bamboo mix *2 | 1200 | 1.43 | 2.10 | 0.07 | 2.0 | 0.52 | 0.385 | 25 |
| 2 | bamboo mix *2 | 1100 | 1.45 | 2.10 | 0.10 | 2.7 | 0.12 | 0.394 | 65 |
| 3 | bamboo mix *2 | 1200 | 1.42 | 2.14 | 0.07 | 1.3 | 0.12 | 0.388 | 53 |
| 4 | bamboo mix *2 | 1300 | 1.42 | 2.11 | 0.06 | 1.0 | 0.11 | 0.387 | 25 |
| Comp. Ex. | | | | | | | | | |
| 1 | bamboo mix *2 | 800 | 1.45 | 1.71 | 0.23 | 63 | 0.14 | 0.396 | 68 |
| 2 | bamboo mix *2 | 1500 | 1.41 | 1.52 | 0.02 | 0.8 | 0.09 | 0.373 | 1 |
| 3 | coffee bean | 1200 | 1.45 | 1.52 | 0.03 | 3.2 | 0.80 | 0.377 | 2 |
| 4 | coconut shell | 1200 | 1.48 | 2.07 | 0.03 | 1.1 | 0.92 | 0.389 | 15 |
| 5 | Phyllostachys | 1200 | 1.47 | 2.11 | 0.05 | 3.0 | 0.10 | 0.388 | 6 |

*1: $ACO_2$: Carbon dioxide adsorption capacity (ml (STP)/g-carbon)
*2: bamboo mix: 1:1 (by weight) mixture of Pleioblastus and Bambusa.

TABLE 2

Battery performance

| | Doping capacity (A) (Ah/kg) | Dedoping capacity (B) (Ah/kg) | Non-dedoping capacity (A − B) (Ah/kg) | Discharge efficiency (%) (B/A) × 100 |
|---|---|---|---|---|
| Ex. | | | | |
| 1 | 595 | 490 | 105 | 82.4 |
| 2 | 775 | 630 | 145 | 81.3 |
| 3 | 710 | 580 | 130 | 81.7 |
| 4 | 560 | 500 | 60 | 89.3 |

TABLE 2-continued

| | Battery performance | | | |
|---|---|---|---|---|
| | Doping capacity (A) (Ah/kg) | Dedoping capacity (B) (Ah/kg) | Non-dedoping capacity (A − B) (Ah/kg) | Discharge efficiency (%) (B/A) × 100 |
| Comp. Ex. | | | | |
| 1 | 805 | 450 | 355 | 55.9 |
| 2 | 370 | 325 | 45 | 87.8 |
| 3 | 507 | 407 | 100 | 80.3 |
| 4 | 538 | 437 | 101 | 81.2 |
| 5 | 550 | 460 | 90 | 83.6 |

INDUSTRIAL APPLICABILITY

As described above, according to the present invention, there is provided a carbonaceous material having a large doping capacity and a large dedoping capacity in combination. Such a carbonaceous material can be easily produced by carbonizing an organic material originated from bamboo genera of family Gramineae under appropriate carbonization conditions. By using a negative electrode prepared from the carbonaceous material according to the present invention, it becomes possible to provide a non-aqueous secondary battery having excellent performances including large charge-discharge capacities.

What is claimed is:

1. A carbonaceous electrode material for a non-aqueous secondary battery, comprising a carbonaceous material having a true density as measured by a butanol substitution method of at most 1.46 g/cm$^3$, a true density as measured by a helium substitution method of at least 1.7 g/cm$^3$, a hydrogen-to-carbon atomic ratio H/C of at most 0.15 as measured according to elementary analysis, a BET specific surface area of at most 50 m$^2$/g as measured by nitrogen adsorption BET method, and a carbon dioxide adsorption capacity of at least 10 ml/g, wherein the carbonaceous electrode material has been obtained by carbonizing at least one of organic materials originated from genus Pleioblastus and genus Bambusa belonging to bamboo genera of family Gramineae.

2. A carbonaceous electrode material according to claim 1, having a potassium content of at most 0.5 wt. % as measured by fluorescent X-ray analysis.

3. A process for producing a carbonaceous electrode material according to claim 1 or 2, comprising: carbonizing the organic material at a temperature of 1000–1400° C. under a reduced pressure or in an inert gas atmosphere.

4. A process according to claim 3, further including a de-ashing treatment step for wet-treating the organic material to provide a carbon precursor having a reduced potassium content of at most 0.5 wt. % as measured by fluorescent X-ray analysis.

5. An electrode structure for a non-aqueous solvent-type secondary battery, comprising: an electroconductive substrate and a composite electrode layer disposed on at least one surface of the electroconductive substrate;

said composite electrode layer comprising a carbonaceous electrode material according to claim 1 or 2 in a particulate form, and a binder.

6. A non-aqueous solvent secondary battery, comprising, a positive electrode, a negative electrode, and a separator and a non-aqueous electrolytic solution disposed between the positive and negative electrodes;

at least one of said positive and negative electrodes comprising an electrode structure according to claim 5.

7. A secondary battery according to claim 6, wherein the electrode structure constitutes the negative electrode.

* * * * *